United States Patent [19]
Johnson et al.

[11] Patent Number: 6,075,353
[45] Date of Patent: Jun. 13, 2000

[54] POWER CIRCUIT FOR LOW POWER SOLENOID OPERATION USING AN AC OR DC SUPPLY

[75] Inventors: Timothy L Johnson, Erie; Silverio S Leandro, Cambridge Springs, both of Pa.

[73] Assignee: Snap-Tite Technologies, Inc., Wilmington, Del.

[21] Appl. No.: 09/042,389

[22] Filed: Mar. 12, 1998

[51] Int. Cl.$^7$ ............................... G05F 1/56; H02M 3/335
[52] U.S. Cl. ................. 323/285; 363/49; 363/16
[58] Field of Search .................... 323/222, 282, 323/284, 285, 288, 290; 363/16, 49, 79, 89

[56] References Cited

U.S. PATENT DOCUMENTS

| | | | |
|---|---|---|---|
| 5,028,861 | 7/1991 | Pace et al. | 323/222 |
| 5,642,267 | 6/1997 | Brkovic et al. | 363/16 |
| 5,687,070 | 11/1997 | Jacobs et al. | 323/222 X |
| 5,777,462 | 7/1998 | Yue | 323/285 |
| 5,804,950 | 9/1998 | Hwang et al. | 323/222 |

OTHER PUBLICATIONS

Unitrode Integrated Circuits Corportaion, Design Notes—100, 48, pp. 10–12. Copyright 1994 by Unitrode Corporation. (No Month).

Unitrode Integrated Circuits Corporation, Unitrode Appl'n Note, U–100A, pp. 9–62 to 9–75, Unitrode Product Applications Handbook 1993–94, Copyright 1993. (No Month).

Unitrode Integrated Circuits Corporation, Unitrode Data Sheet for the Circuit Mode PWM Controller, pp. 5–186 to 5–191, Unitrode Product Applications Handbook 1993–94, Copyright 1993. (No Month).

Unitrode Integrated Circuits Corporation, Unitrode Application Note U–111, pp. 9–134 to 9–151, Unitrode Product Applications Handbook, 1993–94, Copyright 1993, (No Month).

*Primary Examiner*—Y. J. Han
*Attorney, Agent, or Firm*—Woodling, Krost and Rust

[57] ABSTRACT

A power circuit for controlling the amount of power delivered to a solenoid coil is disclosed. A current mode pulse width modulation controller is employed to interrupt the flow of current through a power branch of the circuit. A rectifying bridge enables use of the power circuit with either AC or DC power sources. The power circuit includes a startup current source for initially energizing the pulse width modulation controller. Two feedback voltages, one representing the compensated current through the power branch of the circuit and one representing the output voltage of the power circuit are used by the pulse width modulation controller to output pulses of varying duration at constant frequency to a field effect transistor. The opening of the field effect transistor interrupts the flow of current in the power branch of the circuit.

14 Claims, 2 Drawing Sheets

POWER CIRCUIT FOR LOW POWER SOLENOID OPERATION USING AN AC OR DC SUPPLY

FIELD OF THE INVENTION

The instant invention pertains to those numerous instances wherein it is desired to operate a solenoid coil or other device which experiences the same benefits in steady state conditions at reduced power. The goal is to reduce energy consumption by controlling the net wattage of the solenoid coil. Use of an alternating or direct current power supply for inputting power to the solenoid coil is achieved by the instant invention. The preferred embodiment is shown with respect to the coils powered by DC. However, the inventive concepts will apply equally well to AC powered coils.

BACKGROUND OF THE INVENTION

The problem is not new. The power to initially actuate a solenoid coil is much higher than that necessary to maintain the solenoid in the latched position. The magnetic circuit is different in these two conditions.

Some devices employ a power circuit having a pulsed square wave or rectified sine wave output. These devices lower the net RMS voltage and power to approximately 20% but they experience significant DC ripple which can cause the plunger within the solenoid to drop out. They also suffer from potential reliability problems because they are polarity sensitive. The input voltage tolerance to these devices is +/−10% and the DC ripple can be as much as 20% peak to peak. The input voltage tolerance is narrow because these devices do not have any output voltage sensing apparatus.

SUMMARY OF THE INVENTION

The instant invention reduces power consumption of the solenoid coil by 80 to 90%. Coil life is extended by virtue of lower power consumption by the coil. A rectifying bridge is employed in the preferred embodiment so that either AC or DC power sources may be used. The bridge is not polarity sensitive so the orientation of the positive and negative power leads in the case of the DC power source does not matter.

A power circuit for controlling the amount of power delivered to a solenoid coil is disclosed in the preferred embodiment. The initial voltage applied to the coil may be chosen to be higher than the steady state rating, for example 24 volts applied to a 12 volt coil, to ensure quick and reliable pull in. Thereafter the voltage is reduced to prevent heating etc. A current mode pulse width modulated controller is employed to control the flow of current through a power branch of the circuit. A rectifying bridge enables use of the power circuit with either AC or DC power sources. The power circuit includes a novel startup current source for initially energizing the pulse width modulation controller. Two feedback circuits, one representing a compensated current through a power branch of the power circuit and one representing the output voltage of the power circuit are processed by the pulse width modulation controller (PWMC). The PWMC outputs pulses of varying duration at a constant frequency to a field effect transistor in the power branch of the power circuit. The opening of the field effect transistor interrupts the flow of current in the power branch of the circuit. The shorter the duration of the pulses the less time the field effect transistor in the power branch of the power circuit is closed and the less power is delivered to the output of the power circuit for a given input voltage. The longer the duration of the pulses the more time the field effect transistor in the power branch is closed and more power is delivered to the output of the power circuit.

Two inductors are used. A coupling capacitor is interposed between the first inductor and the second inductor. Control of the output voltage and output current of the circuit are effected by two feedback circuits (in the preferred embodiment voltages) inputted to the current mode pulse width modulation controller. The power branch of the circuit containing the field effect transistor is at a node located between the first inductor and the current coupling capacitor. The voltage and current at this node are constantly changing in value due to the operation of the field effect transistor in the power branch of the power circuit.

Accordingly, it is an object of the present invention to provide a circuit to control the output power in the steady state energized condition thereof to 10 to 20% of the rated wattage of the coil.

It is a further object of the present invention to provide a power circuit capable of delivering high output power to the solenoid coil during initial energization thereof.

It is a further object of the present invention to provide a power circuit capable of delivering high output power to the solenoid coil for 0.3–0.5 seconds after initial energization thereof.

It is a further object of the present invention to use the energy stored in the magnetic fields of two inductors to supply output power to the solenoid coil.

It is a further object of the present invention to provide a pulse width modulation controller to gate a field effect transistor allowing different amounts of current to flow through the power branch of the circuit containing the field effect transistor.

It is a further object of the present invention to provide a branch of the circuit in parallel with the output of the circuit which branch contains a resistor and a capacitor for operating a junction field effect transistor. The junction field effect transistor is in series with a resistor which is in parallel with another resistor to develop a feedback voltage representative of the voltage output of the power circuit.

It is a further object of the present invention to provide a current sensing circuit, (or first feedback voltage sensing circuit) for sensing the current (inferred by a voltage measurement) in the power branch of the circuit containing the field effect transistor.

It is a further object of the present invention to provide a current sensing circuit, (or first feedback voltage sensing circuit) for sensing the current (inferred by a voltage measurement) in the solenoid.

It is a further object of the present invention to provide a compensated current sensing circuit for use by the current mode pulse width modulation controller.

It is a further object of the present invention to provide a voltage sensing circuit which senses the solenoid voltage. The voltage sensing circuit includes two parallel resistors. During normal low power output of the power circuit, the second feedback voltage is sensed across one of the resistors to ground. When the solenoid coil is first being energized, the second feedback voltage is sensed across two resistors in parallel to ground. The second resistor is in the circuit by means of a closed, junction field effect transistor which is in series with the second resistor. The normally closed junction field effect transistor is no longer gated, or closed, when the voltage applied to its gate reaches approximately 3.0 VDC.

The voltage applied to the gate of the junction field effect transistor is sensed across a capacitor to ground in a resistor-capacitor branch of the circuit measured across the output of the power circuit. The time constant of the circuit together with the ramping of the voltage across the output of the power circuit provides a 0.3 to 0.5 second delay before the junction field effect transistor opens (is not gated). This 0.3 to 0.5 second delay has been found to be a sufficient delay for initially energizing the solenoid coil (load) rated at 24 volts, 15 watts. Other time consultants can be used to provide longer or shorter energizing power to other solenoid coils as will become apparent from the present teachings.

It is a further object of the present invention to provide a startup current means for supplying power to the pulse width modulation controller.

It is a further object of the present invention to include a resistor and a capacitor as part of the current sensing circuit. The capacitor provides a smooth voltage which is input to the pulse width modulation controller together with a clocked compensated signal.

It is a further object of the present invention to provide a startup current source for initially powering the current mode pulse with modulation controller which includes a metal oxide semiconductor field effect transistor, an amplifier (voltage regulator), a transistor, resistors and diode which allow 10 VDC power to pass to the PWMC.

It is a further object of the present invention to provide a power circuit for energizing a solenoid coil which is operable with DC voltage sources and is not polarity sensitive.

It is a further object of the present invention to provide a power circuit for powering a solenoid coil which is operable with AC power sources in the range of 40–140 VAC at either 50 or 60 hz or DC power sources in the range of 10.8–140 VDC.

It is a further object of the present invention to eliminate AC buzz of solenoid coils.

It is a further object of the instant invention to provide a power circuit that has no DC ripple on the output of the power circuit.

It is a further object of the present invention to provide a power circuit which eliminates AC solenoid coil buzz and AC coil burn out.

The objects of the invention will be better understood when taken in conjunction with the Brief Description of the Drawings, the Detailed Description of the Invention and the Claims that follow.

DETAILED DESCRIPTION OF THE INVENTION

Figure 1:
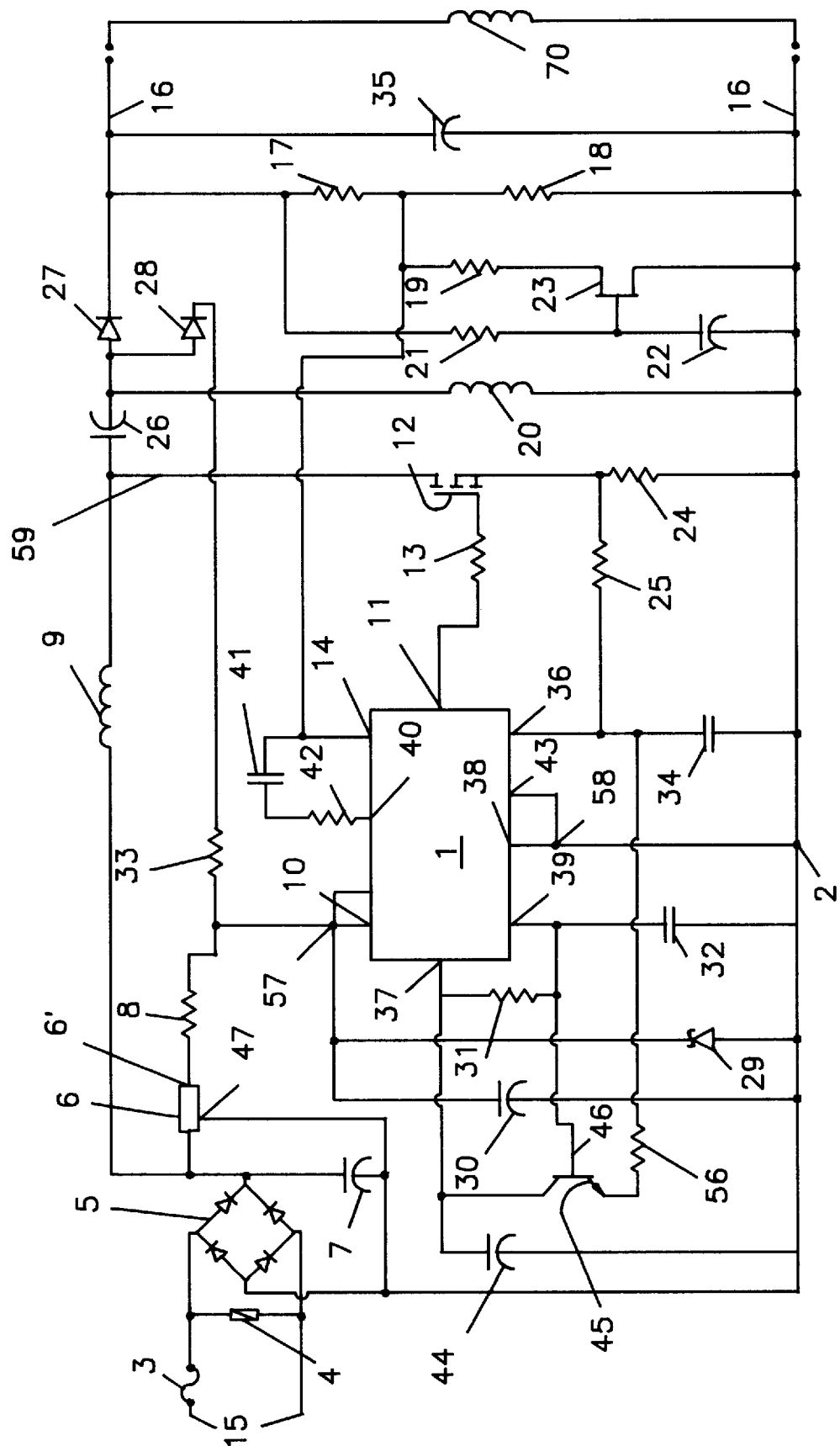
FIG. 1 is a schematic drawing of the power circuit.

Referring to FIG. 1, current mode pulse width modulation controller 1 is an integrated circuit, a Unitrode UC 3843AD. The pulse width modulation controller has a first input which senses the voltage across resistor 24. Resistor 24 is a 0.22 Ω resistor. Resistor 25 is a 49.9 Ω resistor. Capacitor 34 is a 220 pF capacitor yielding a very short time constant. Reference numeral 37 is a 5 VDC reference output by the pulse width modulation controller 1. Resistor 31 is a 10 kΩ resistor and capacitor 32 is a 0.001 µF capacitor. Together, resistor 31 and capacitor 32 set the clock input 39 of the pulse width modulation controller at 100 kHz.

Reference numeral 39 is a clock input to the PWMC 1. Input 39 reaches approximately 3 VDC and then resets at 1 VDC. Capacitor 32 discharges when clock input 39 resets.

The cycling of the clock applies and removes voltage from the base 46 of the transistor 45. Capacitor 44 is a 0.1 µF capacitor which stabilizes the 5 VDC reference voltage at output 37. Transistor 45 conducts more current when voltage is applied to the base 46 thereof Resistor 56 is a 3.01 kΩ resistor. A sawtooth wave is generated at the clock 39 which follows the charging of capacitor 32. Current flows to the junction of the resistor 25 and capacitor 34 via transistor 45.

The currents flowing through resistors 25 and 56 are summed into a voltage across capacitor 34. The current flowing through resistor 56 is a slope compensation current and is summed with the current through resistor 25.

Zener diode 29 and capacitor 30, a 10 µF capacitor, regulate and stabilize respectively, the input voltage applied to power input 10 of the PWMC.

Reference numeral 38 indicates a ground on the PWMC. Reference numeral 10 is the power input to the PWMC which is connected to resistors 8 and 33. Reference numeral 14 is the second (voltage) input of the PWMC. A feedback voltage is applied to second input 14. Capacitor 41 is a 0.1µF capacitor in series with 42, a 5.11 kΩ resistor. Capacitor 41 and resistor 42 provide high frequency compensation of the voltage feedback from the output of the power circuit. Reference numeral 40 is the compensating input to the PWMC.

It will be apparent to those skilled in the art that the PWMC is being employed as a current mode PWMC. Reference numeral 11 is the output of the PWMC which is buffered by resistor 13, a 10 Ω resistor. The output 11 of the PWMC controls the field effect transistor 12.

A supply voltage input is applied at the terminals denoted by reference numeral 15 in FIG. 1. A metal oxide varistor 4 is applied across the input terminals for surge protection. Fuse 3 provides overpower protection. Rectifying bridge 5 converts alternating current to direct current. The input voltage may be in the range of 10 to 140 VDC or 40 to 140 VAC at either 50 or 60 Hz. A 10 µF power supply filtering capacitor 7 is used to stabilize the input voltage. One side of the bridge is connected to a ground 2. Node 2 is either a common voltage or ground. A common voltage may be impressed on the node 2 shown in FIG. 1.

Inductor 9 is a 100 µH inductor. This inductor is known as a boost to those skilled in the art. Capacitor 26 is an AC current coupling capacitor between the inductor 9 and the output. The voltage at the node between inductor 20 and capacitor 26 is switching due to the field effect transistor 12 switching the current in the power branch 59 of the power circuit. Inductor 20 is a 100 µH inductor. Inductor 20 once energized, supplies power to the output of the power circuit when field effect transistor 12 closes and current flows through the power branch 59 of the power circuit. When the current mode PWMC outputs a voltage to the field effect transistor 12 it closes for the duration of the pulse width. The pulse width is operating at 100 kHz and the duration of the pulses vary. The amount of current that flows through the power branch 59 of the power circuit beginning at the node connecting inductor 9 and capacitor 26 and terminating at node 2 and passing through resistor 24 is a function of the input voltage at the output of the rectifying bridge 5, the time that the inductor 9 has charged and the amount of charge held in the field of inductor 9, the discharge of capacitor 26 (a 2.2 µF current coupling capacitor), and the amount of time that field effect transistor 12 is closed, and the resistance of the field effect transistor 12, as is known in the art.

Figure 2:
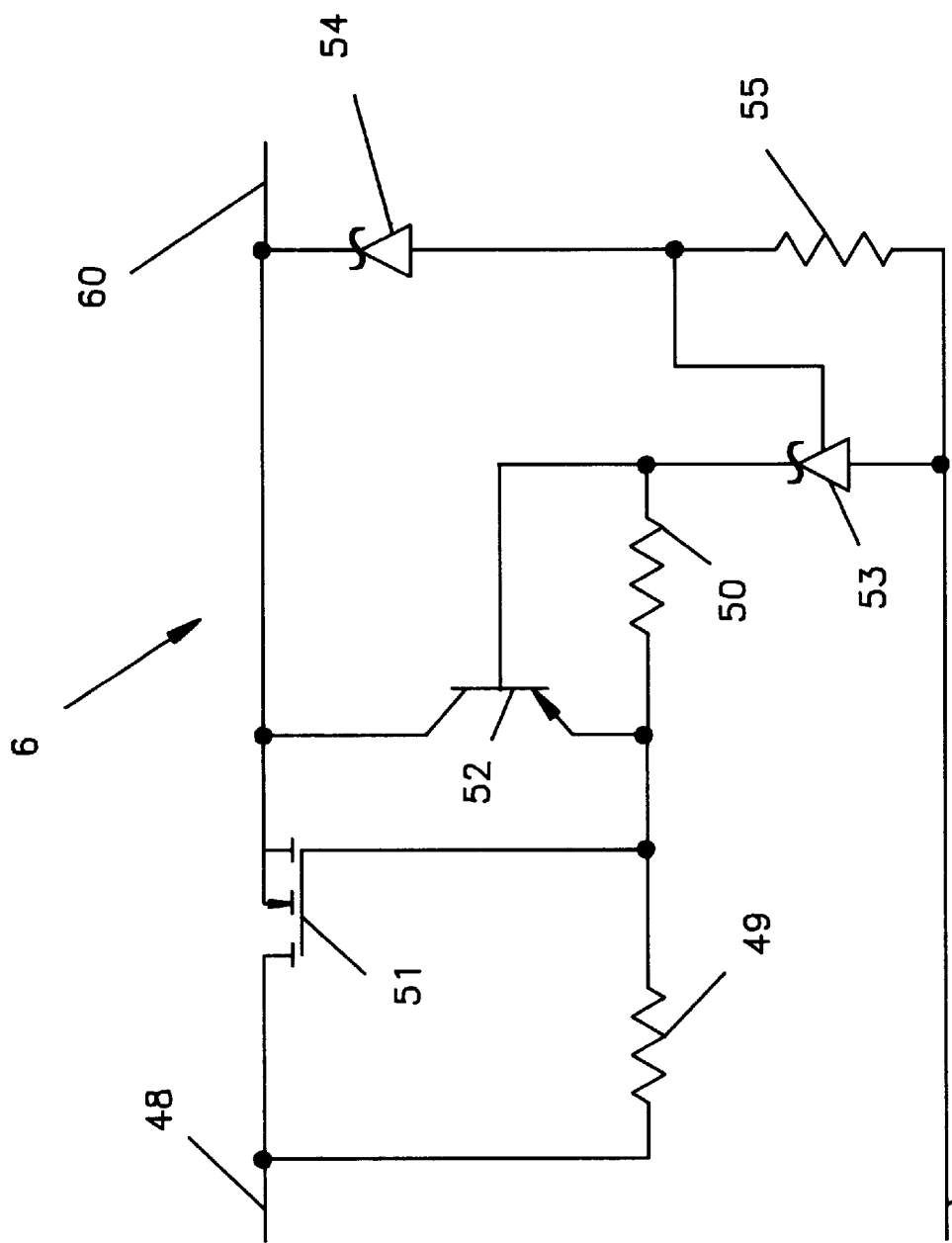
FIG. 2 is a schematic drawing of the startup current source.

The startup current source 6 necessary to power 1 and associated circuitry is shown in FIG. 2. Resistor 8 (FIG. 1) is a 220 Ω resistor and it drops a voltage as current flows out of the current source 6. Current source 6 is used during the startup of the circuit. Once power is established to the inductor 9 and the capacitor 26 for a sufficient amount of time, diode 28 passes current through resistor 33 to power PWMC 1 and its circuitry. This reduces the power dissipation in 6 which may otherwise be considerable if the maximum input voltage is applied to 15. Resistor 33 is a 49.9 Ω resistor.

Referring to FIG. 2, reference numeral 48 indicates incoming voltage (and current) applied to the current source 6 from bridge rectifier 5. Reference numeral 47 illustrates ground or common. Resistors 49 and 50 are 100 kΩ resistors. Metal oxide semiconductor field effect transistor (MOSFET) 51 is in series with incoming power on line 48. Reference numeral 52 is a transistor. Reference numeral 54 is a 10 volt zener diode. Reference numeral 55 is a 10 kΩ resistor and reference numeral 53 is a voltage regulator (amplifier). Metal oxide semiconductor field effect transistor 51 is a variable linear impedance. The larger the voltage on the gate of MOSFET 51 the more current flows from the drain to the source. The drain is the side of the MOSFET 51 near the input power source 48 and the source is the other side. Transistor 52 shunts voltage across gate resistor 55 and zener diode 55 establishes the feedback for zener diode 53 to the source when sufficient voltage is applied to the source of MOSFET 51. Zener diode 54 permits current to flow when the output 60 of the current source 6 exceeds 10 VDC either due to current flow through 51 or resistors 33 and 8. MOSFET 51 is a variable impedance and drops voltage when, for example, 24 VDC is applied to input power source 48. The drop across MOSFET 51 will be 14 VDC in this example. Linear regulator 53 acts as a variable impedance. The current of the circuit of FIG. 2 is reduced after the start of current flow in diode 28 and resistor 33. The circuit of FIG. 2, just described, is a linear regulator.

Referring again to FIG. 1 and in particular referring to the right most or output portion of the figure, resistor 17 is a 48.7 kΩ resistor and resistor 18 is a 14.7 kΩ resistor. Reference numeral 27 indicates a diode through which power passes to the output 16 of the circuit. The output voltage across terminals 16 changes as a function of the feedback voltage. The feedback voltage is the voltage across resistor 18. The maximum power output of the circuit on terminals 16 is nominally 24 VDC at 1.5 A and the normal power output of the circuit is nominally 10.8 VDC at approximately 0.28 A. Load 70 is a solenoid coil which includes a plunger.

Reference numeral 19 is a 5.11 kΩ resistor in series with a junction field effect transistor 23. The transistor 23 is normally closed and opens when its base voltage is approximately 3.0 VDC. It takes approximately 0.3 to 0.5 seconds after initial energization of the power circuit to charge capacitor 22 to approximately 3 VDC. It will be understood by those skilled in the art that the voltage at the output of diode 27 is a dynamic voltage from the standpoint that it does not instantaneously reach 24 VDC upon initial energization of the power circuit. Rather, the voltage ramps up to approximately 24 VDC upon initial energization of the power circuit. The higher power output is necessary to initially energize the solenoid coil. Because the voltage on 22 is the integral of current through resistor 21 which in turn is proportional to the voltage at 16, the voltage on 22 may be thought of as a measure of, or proportional to, the current passed through the solenoid at initial energization. The charging of capacitor 22 may be thought of as a time delay.

The junction field effect transistor 23 is controlled by the RC circuit made up of resistor 21 and capacitor 22. Resistor 21 is a 2 MΩ resistor and capacitor 22 is a 0.47 μF capacitor. This RC branch of the circuit is across the output of the power circuit.

The voltage across resistor 18 changes depending whether or not resistor 18 is in parallel with resistor 19. When resistors 18 and 19 are in parallel the voltage across them will decrease and the voltage sensed at the second input 14 to the PWMC 1 will also decrease.

The output 11 of the PWMC is dependent upon the voltage applied to the first input 36 and second input 14 of the PWMC. The voltage applied to the first input 36 is the voltage across capacitor 34 which is created by the currents flowing through resistors 25 and 56. Ignoring resistor 56, the current flowing through the resistor 25 will charge capacitor 34 to the voltage across resistor 24. The current flowing through resistor 56 will add additional charge to capacitor 34. The current through resistor 56 is from the slope compensating network. The slope compensating network is comprised of resistor 56 and transistor 45. Resistor 31 and capacitor 32 are the RC components for the PWMC clock. This slope compensating network combines a voltage which is representative of the primary current through resistor 24. The Unitrode current mode pulse width modulation controller 1 processes the feedback voltage from the output circuit which is impressed on the second input 14 to the controller together with the compensated current input which is impressed on the first input 36 to form pulses of sufficient duration to maintain the desired voltage across resistor 18 which in turn maintains the desired voltage at 16.

Output 11 clocks pulses of varying widths at 100 kHz. The maximum pulse width is typically 97%. When the pulse widths are at their maximum the power circuit is in a current limiting mode meaning that the amount of power being transferred to the output circuit through the current coupling capacitor 26 and diode 27 is limited. The circuit is thus protected against shorts to ground (or other problems) on the output side. The maximum current through the solenoid is also limited. The maximum pulse widths occur when the voltage applied to the first input 36 exceeds 1 VDC. The PWMC acts to control the current through the resistor 24 and thus the corresponding solenoid current, by forcing it to follow the error between voltage applied to second input 14 and an internal voltage (2.5 VDC) of the PWMC.

The output across terminals 16 is filtered by capacitor 35 which is a 47 μF capacitor.

Simplistically described, it will be recognized that upon initial excitation of the circuit by application of voltage at 15, that the output voltage 16 will quickly ramp up to a maximum of 24 volts at which time the voltage at 14 which is determined by the resistor divider comprised of resistor 17 in series with the parallel combination of resistors 18 and 19 causes the PWMC 1 to begin to limit and maintain the output voltage at terminal 16 to approximately 24 volts.

Simultaneously the current through current sense resistor 24 begins to charge capacitor 34, and the voltage at 16 causes current to flow through resistor 21 to charge capacitor 22. Current through the solenoid coil will increase as determined by its electrical characteristics toward a steady state value which would otherwise be limited only by the coil's resistance.

The electrical characteristics affecting the rate at which the solenoid's current increases include the series resistance, inductance and stray capacitance of the coil. The inductance is affected by the position of the plunger and current in the coil and all of the parameters are normally affected by temperature. Without other control, the pull in time of the solenoid will vary depending on temperature, and the mechanical condition (dirt, wear, etc.) of the solenoid.

When the current in resistor 24 reaches a value which corresponds to the solenoid coil minimum plunger pull current out of terminal 16, the pulse width at 11 is caused to be changed to limit the terminal 16 current to that value. This effectively causes the buildup of magnetic field in the solenoid to occur at a predictable and steady rate which is mostly insensitive to the previously mentioned variables. This limitation allows fairly accurate determination of the total magnetic field in the solenoid, and thus a related knowledge of the position of the solenoid plunger. In other words this provides a method of determining when the plunger is assured of being fully pulled in by either elapsed time or by the integral of the current through resistor 21, without undue effects of the variables mentioned above. In addition, it provides some control on the speed at which the plunger is pulled in, as that speed is somewhat proportional to coil current.

At a time thereafter which is determined by the integral of the current through 21, the values of resistor 21 and capacitor 22, transistor 23 is turned off. The turn off of 23 removes the effect of resistor 19, causing a rapid increase of the voltage at 14, thus causing PWMC 1 to limit the voltage at 16 to a new and lower value. This lower value is selected to be high enough to reliably maintain the solenoid in an energized state while not being so high as to cause unwanted or excessive heating and other effects as previously described.

The values of resistor 21 and capacitor 22 may be chosen to create a simple time delay, causing 23 to turnoff a known time after the appearance of a certain voltage at 16, or may be chosen to represent the integral of the current through resistor 21 which in turn is a measure of the current flowing in the solenoid, which in turn is a measure of the magnetic field and thus the position of the plunger of the solenoid.

It is possible to first limit the solenoid current and then afterward to reduce the current to a hold in value by one of the described methods, or to simply use the current limit as a failure safety feature and merely use either a time delay or a measure of the of coil current to reduce the hold in current as desired to meet particular requirements when utilizing the present invention.

From the teachings herein, one of ordinary skill in the art will be able to adjust the values of the various components for optimum performance, for example, R24 and C34 to control the maximum current and the response timing of the current limitation, capacitor 41 and resistor 42 for the response timing of the output voltage on 16, resistor 21 and capacitor 22 to control either timing or measure of solenoid parameters as discussed above, as well as the values of resistors 17, 18, and 19 to control the pull in and hold in currents of the solenoid. Such adjustments may be made to allow optimization of the invention for use in particular applications where one parameter may be more desirable than another.

It will be recognized by those skilled in the art that the present invention has been disclosed by way of example only and the invention shall not be limited to the embodiment disclosed. Further, those skilled in the art will recognize that many changes may be made to the present invention without departing from the scope of the appended claims.

What is claimed is:

1. A power circuit for a solenoid comprising: a pulse width modulation controller having a feedback input, a current sensing input, and an output signal; a field effect transistor having a gate, a drain, and a source; feedback circuit means; current signal circuit means for providing a signal to said current sensing input of said pulse width modulation controller; said output signal of said pulse width modulation controller being in electrical communication with said gate of said field effect transistor; a first inductor; a coupling capacitor; a second inductor; said first inductor providing power to said circuit means for providing said current signal when said gate of said field effect transistor is energized by said output of said pulse width modulation controller; said coupling capacitor coupling said first inductor and said second inductor and permitting flow of current therebetween and to said feedback circuit means; said feedback circuit means further comprising timing means for regulating said feedback circuit so as to allow high power energization of a solenoid coil for a period of time followed by low power energization of said solenoid coil thereafter.

2. A startup current source for use in powering a pulse width modulation controller comprising a power source; a metal oxide semiconductor field effect transistor in series with a power source; said metal oxide semiconductor field effect transistor having a first gate and said first gate being in electrical communication with said power source; a transistor having a second gate and said second gate being in electrical communication with said power source; said metal oxide semiconductor field effect transistor operable at a first voltage applied to said first gate; said metal oxide semiconductor field effect transistor operable at a second voltage applied to said second gate; said second voltage being lower than said first voltage; and, a zener diode for shunting excess power to ground through a resistor.

3. A process for controlling the energization of a solenoid coil comprising the steps of:

energizing a pulse width modulation controller for controlling a power branch of a solenoid power circuit;

providing a first analog feedback voltage to said pulse width modulation controller which is an analog representation of the output voltage of said power circuit to said solenoid coil;

providing a second analog feedback voltage to said pulse width modulation controller which is an analog representation of the current through said power branch of said solenoid power circuit;

varying the pulse width output of said pulse width modulation controller in response to said first feedback voltage and said second feedback voltage;

outputting said pulse width of said pulse width modulation controller to a field effect transistor in said power branch of said power circuit;

controlling the current in said branch of said power circuit in response to said pulse width;

and, controlling the power supplied to said solenoid coil.

4. A process for controlling the energization of a solenoid coil as claimed in claim 3 wherein the step of providing a second feedback voltage includes providing a timing circuit means for lowering said second feedback voltage during initial energization of said solenoid coil.

5. A process for controlling the energization of a solenoid coil as claimed in claim 3 further comprising the step of rectifying the input voltage to the power circuit for energizing said solenoid coil.

6. A process for controlling the energization of a solenoid coil as claimed in claim 3 wherein the step of energizing a pulse width modulation controller includes providing a startup current generator.

7. A power circuit for energizing a solenoid coil comprising:
   a) input power ports and output power ports;
   b) a rectifying bridge for rectifying alternating current power sources into a direct current source;
   c) a pulse width modulation controller having an output with varying pulse widths;
   d) a first inductor in electrical communication with said rectifying bridge;
   e) a second inductor;
   f) a coupling capacitor interposed between said first inductor and said second inductor;
   g) a field effect transistor residing in a power branch of the power circuit;
   h) said field effect transistor being in electrical communication with said output of said pulse width modulation controller;
   i) a current source for initially supplying power to said pulse width modulation controller;
   j) said pulse width modulation controller being powered by said coupling capacitor after initial energization of said pulse width modulation controller;
   k) a first voltage feedback means sensing the current flow through said power branch of said power circuit;
   l) a second voltage feedback means sensing the voltage output of the power circuit;
   m) said pulse width modulation controller having a first input in electrical communication with said first voltage feedback means;
   n) said pulse width modulation controller having a second input in electrical communication with said second voltage feedback means;
   o) and, said pulse width modulation controller outputs pulses of fixed frequency varying in width in response to said first and second voltage feedbacks regulating said output voltage of said power circuit.

8. A power circuit for energizing a solenoid coil as claimed in claim 7 wherein said second voltage feedback means includes parallel resistors which are operable when said solenoid coil is initially energized.

9. A power circuit for energizing a solenoid coil as claimed in claim 8 wherein said second voltage feedback means includes a junction field effect transistor in series with one of said parallel resistors and said junction field effect transistor.

10. A power circuit for energizing a solenoid coil as claimed in claim 9 wherein said junction field effect transistor is controlled by an R-C branch of said power circuit in parallel with the output of said power circuit.

11. A power circuit for energizing a solenoid coil as claimed in claim 7 wherein said current source includes: a power source; a metal oxide semiconductor field effect transistor in series with a power source; said metal oxide semiconductor field effect transistor having a first gate and said first gate being in electrical communication with said power source; a metal oxide semiconductor field effect transistor having a second gate and said second gate being in electrical communication with said power source; said metal oxide semiconductor field effect transistor operable at a first voltage applied to said first gate; said metal oxide semiconductor field effect transistor operable at a second voltage applied to said second gate; said second voltage being lower than said first voltage; and, a zener diode for shunting excess power to ground.

12. A power circuit for a solenoid comprising an input and an output; a pulse width modulation controller; a first inductor; a second inductor; a coupling capacitor interconnecting said first and second inductors and permitting flow of current between said first and said second inductors; said pulse width modulation controller having an output, a first input and a second input; a current sensing means for providing a ramp voltage to said first input; a feedback means for providing a voltage to said second input of said pulse width modulation controller; said output of said pulse width modulation controller varying in response to said voltages applied to said first and second inputs of said pulse width modulation controller; and, said feedback means includes switching means for providing a lower feedback voltage during initial energization of the solenoid.

13. A power circuit for a solenoid as claimed in claim 12 wherein said current sensing means includes slope compensating means to stabilize the output of the pulse width modulation controller.

14. A power circuit for a solenoid comprising: a controller having a feedback input, a current sensing input, and an output; feedback circuit means; current signal circuit means for providing a signal to said current sensing input of said controller; said output of said controller being in electrical communication with said current signal circuit means; and, said feedback circuit means further comprising timing means for regulating said feedback circuit so as to allow high power energiztion of said solenoid for a period of time followed by low power energization of said solenoid thereafter.

* * * * *

UNITED STATES PATENT AND TRADEMARK OFFICE
CERTIFICATE OF CORRECTION

PATENT NO. : 6,075,353
DATED : June 13, 2000
INVENTOR(S) : Timothy L. Johnson et al.

It is certified that error appears in the above-identified patent and that said Letters Patent is hereby corrected as shown below:

Column 3,
Line 10, delete "consultants" and insert -- constants --.
Line 23, delete "with" and insert -- width --.

Column 7,
Line 45, delete "of", second occurrence.

Signed and Sealed this

Fifth Day of February, 2002

JAMES E. ROGAN
Director of the United States Patent and Trademark Office